(12) United States Patent  
Lerios et al.

(10) Patent No.: US 9,058,662 B2
(45) Date of Patent: Jun. 16, 2015

(54) SYSTEMS AND METHODS FOR NON-DESTRUCTIVE EDITING OF DIGITAL IMAGES

(75) Inventors: Apostolos Lerios, Austin, TX (US); Jennifer Dolson, Menlo Park, CA (US); John Pottebaum, San Francisco, CA (US); Dirk John Stoop, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 157 days.

(21) Appl. No.: 13/587,837

(22) Filed: Aug. 16, 2012

(65) Prior Publication Data

US 2014/0050419 A1    Feb. 20, 2014

(51) Int. Cl.
  *G06K 9/00*  (2006.01)
  *G06T 3/00*  (2006.01)
  *G06T 11/60* (2006.01)

(52) U.S. Cl.
  CPC ............... *G06T 3/0056* (2013.01); *G06T 11/60* (2013.01)

(58) Field of Classification Search
  USPC ........... 382/100, 162, 276; 709/219; 715/744, 715/753
  See application file for complete search history.

(56) References Cited

U.S. PATENT DOCUMENTS

| | | | | |
|---|---|---|---|---|
| 5,651,069 | A * | 7/1997 | Rogaway | 380/28 |
| 8,225,413 | B1 * | 7/2012 | De et al. | 726/26 |
| 2002/0005847 | A1 * | 1/2002 | Hiroi | 345/419 |
| 2004/0017393 | A1 * | 1/2004 | Easwar | 345/744 |
| 2010/0080412 | A1 * | 4/2010 | Zafar et al. | 382/100 |
| 2013/0088569 | A1 * | 4/2013 | Fredericks | 348/43 |

\* cited by examiner

*Primary Examiner* — Chan Park
*Assistant Examiner* — Eueng-Nan Yeh
(74) *Attorney, Agent, or Firm* — Baker Botts L.L.P.

(57) ABSTRACT

In one embodiment, a method includes receiving at least one transformation identifier associated with a first image maintained by a social networking system. The transformation identifier includes at least one transformation version. The method further includes determining at least one transformation for application to the first image based on the at least one transformation identifier and the at least one transformation version.

19 Claims, 8 Drawing Sheets

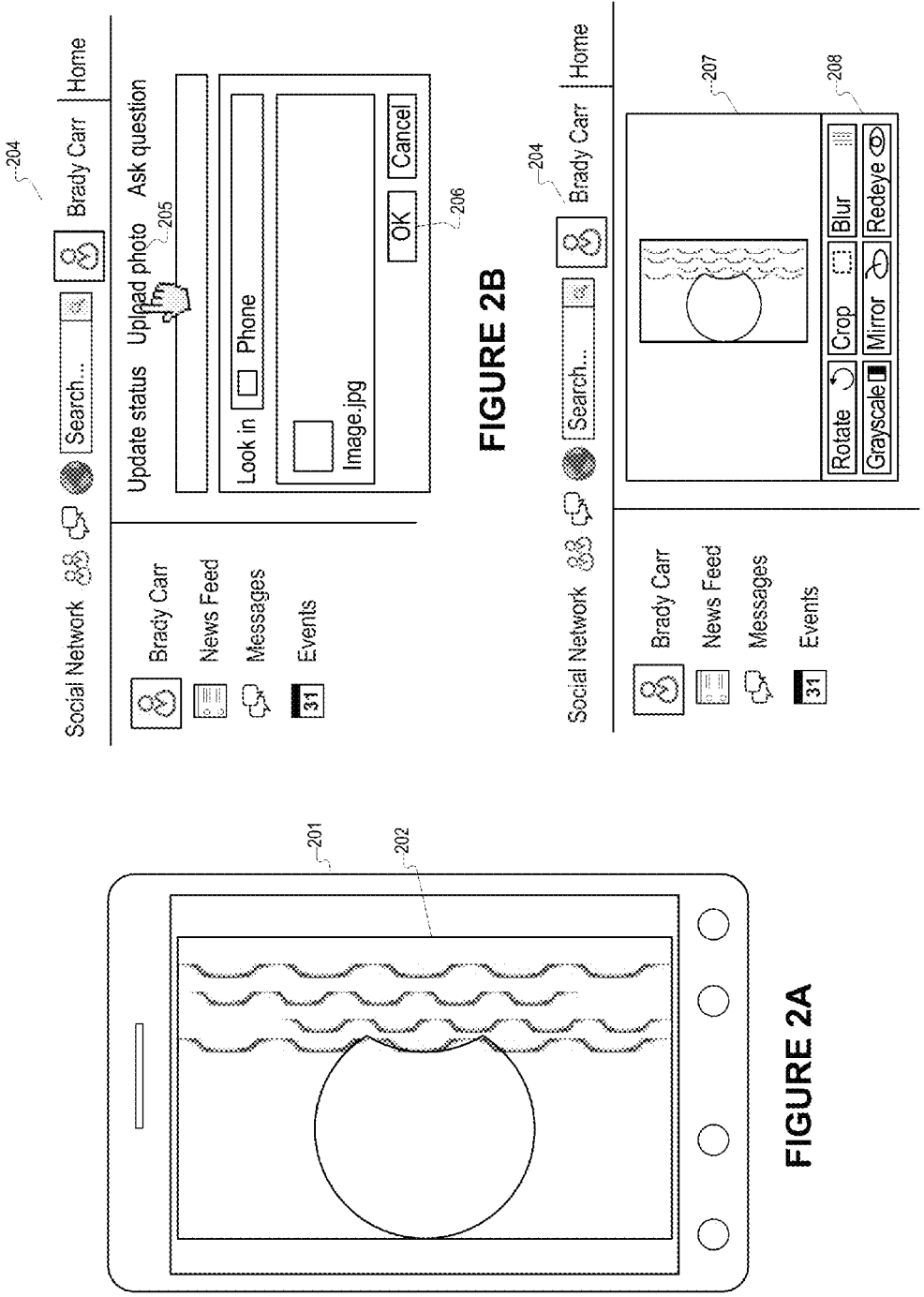

SYSTEMS AND METHODS FOR NON-DESTRUCTIVE EDITING OF DIGITAL IMAGES

FIELD OF THE INVENTION

The present invention relates to the field of social networking. More particularly, the present invention provides a technique for managing transformations applied to an image submitted by a user of a social networking system.

BACKGROUND

Internet social networks have become a significant phenomenon. Social networks allow an internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Information on a user's profile is often only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as images. Users may assemble albums that include photographs and other content and share their albums with their friends. This functionality may include the ability to edit media uploaded to a social network. Users may apply certain photo editing techniques and transformations that are provided as part of a suite of graphics editing tools within a social networking user interface. Because of their collaborative nature, social networks have now become a popular means by which many people share photos and other media content.

SUMMARY

To allow for non-destructive editing of images within a social networking system, embodiments of the invention include systems, methods, and computer readable media to facilitate applying, to an image, transformations selected on a user device. At least one transformation identifier associated with a first image maintained by a social networking system is received, wherein the at least one transformation identifier includes at least one transformation version. At least one transformation for application to the first image is determined based on the at least one transformation identifier and the at least one transformation version.

In an embodiment, a request for an altered image may be received from a consuming client. Capabilities of the consuming client may be determined, and a first image copy may be created based on the first image and the capabilities. In an embodiment, the consuming client may be at least one of a smart consuming client and a simple consuming client. The at least one transformation may be applied to the first image copy to create an altered image copy, and the altered image copy may be provided to a consuming client. Alternatively, the first image copy and an indication of the at least one transformation may be provided to a consuming client.

In an embodiment, at least one transformation version may be determined based on the at least one transformation and the capabilities. An altered image copy may be created by applying the at least one transformation version to the first image copy. The altered image copy may be provided to the consuming client. Alternatively, the first image copy and the at least one transformation version may be provided to the consuming client.

In an embodiment, a consuming client identifier may be received, and the capabilities of the consuming client may be determined based on the consuming client identifier. The at least one transformation may be determined based on the capabilities. In an embodiment, a publishing client identifier may be received, and the at least one transformation may be determined based on the publishing client identifier.

In an embodiment, the at least one transformation identifier may include a character string, which may be parsed by the social networking system. The at least one transformation identifier may be expressed in a human readable language. The at least one transformation identifier may be provided by a first user of the social networking system to a second user of the social networking system.

In an embodiment, the at least one transformation identifier may be mapped to a hash based on a hash function. The at least one transformation identifier may include a random number seed to be used in the at least one transformation.

In an embodiment, the at least one transformation identifier may be used to apply the at least one transformation to a second image. The first image may be associated with a first user of the social networking system and the second image may be associated with a second user of the social networking system.

Many other features and embodiments of the invention will be apparent from the accompanying drawings and from the following detailed description.

BRIEF DESCRIPTION OF THE DRAWINGS

FIG. 2A illustrates a user of a social networking system copying to his computer an image captured using his digital camera in accordance with an embodiment of the invention.

FIG. 2B illustrates the user accessing a user interface to upload the image to the social networking system in accordance with an embodiment of the invention.

FIG. 2C illustrates the image uploaded to the social networking system and displayed within a user interface in accordance with an embodiment of the invention.

Figure 1:
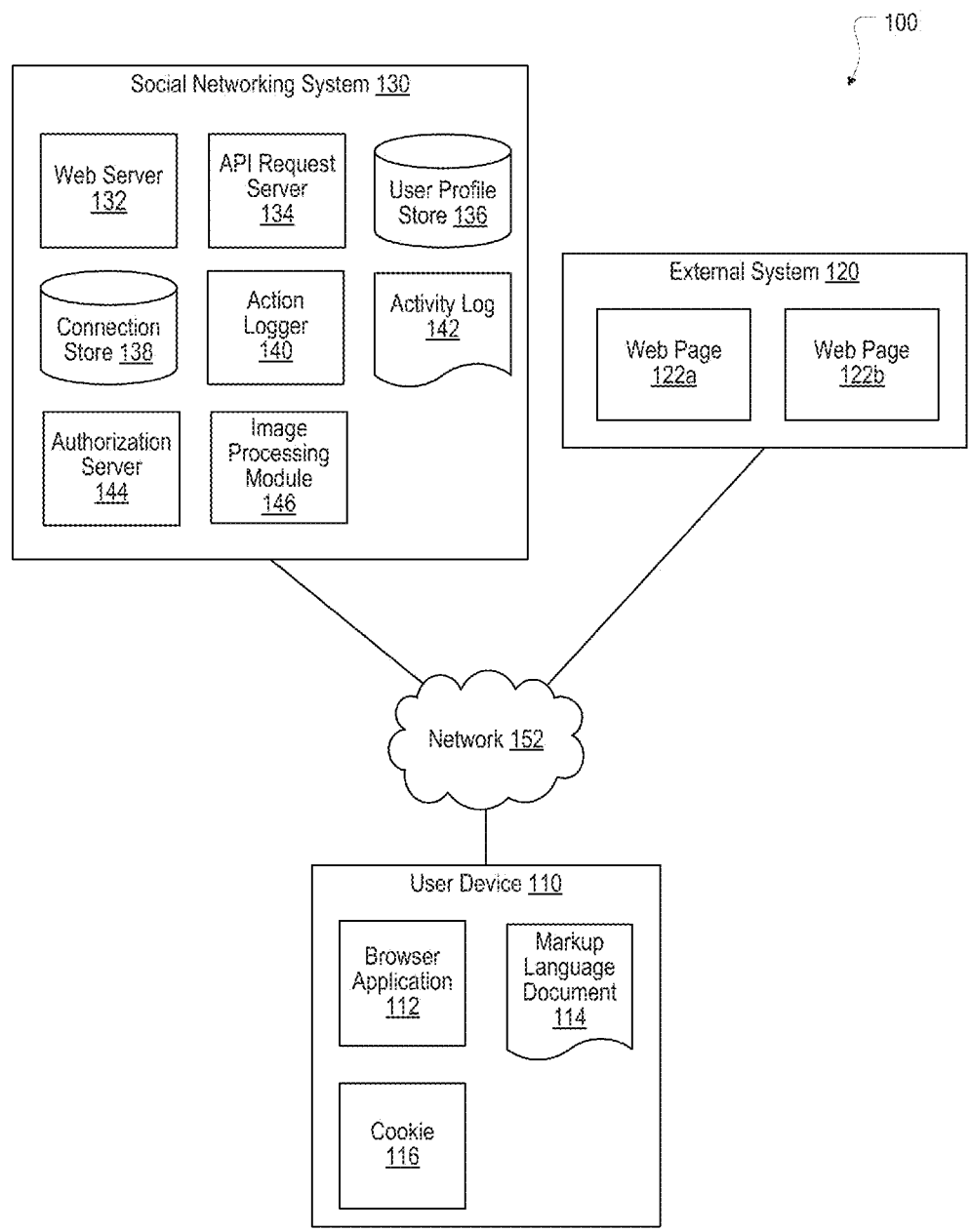
FIG. 1 depicts a system for facilitating the editing of digital images within a social network in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for facilitating the editing of digital images within a social network in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110. In one embodiment, the user device 110 also includes a news feed rendering module 118.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and an image processing module 146. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The social networking system 130 may also include an image processing module 146. The image processing module 146 may receive images from the user device 110, provide images to the user device 110, and apply any of the techniques for processing images described herein.

Non-Destructive Image Editing

Users may take advantage of the collaborative features and functionality of the social networking system 130 to upload and share digital images. Users of the social networking system 130 may upload images for display on their user profiles. For example, a user of the social networking system 130 may upload a profile picture that features prominently on her profile and identifies her to friends and other users. A user may also upload a cover image that may be displayed as a banner across the top of the user's profile. In addition to images for display on user profiles, users may also upload images for sharing with other users, such as photographs of an event, artwork, professional photography portfolios, photographs from nature, or any other type of digital images.

A user of the social networking system 130 may wish to edit and modify images uploaded to the social networking system 130. Using a photo editing application, the user may modify the photo by applying transformations to the original image. Transformations may include discrete operations such as cropping, blurring, filtering, rotating, or any other modification of the original image. A transformation may comprise an operation (e.g., crop) and a set of parameters (e.g., a range of pixels to be included in the cropped image). According to one embodiment of the invention, a transformation may comprise multiple operations. For example, a transformation may produce an effect that is the result of several discrete operations that are grouped as a single transformation. According to another embodiment, some or all transformations may comprise discrete operations.

Transformations may be applied to images stored within the social networking system 130 in a number of ways. It may be possible to download the image from the social networking system 130 to a user device 110, apply the transformations to the image using a photo editing tool on the user device 110, said tool being separate from the social networking system 130, and re-upload the altered image back from the user device 110 to the social networking system 130. However, downloading and uploading images in order to edit them may result in inefficient use of the resources of the social networking system 130, since both the original image and the altered image may be stored within the social networking system 130 even if the user no longer needs one or more of the images. Moreover, use of compression techniques by the social networking system 130 in downloading the original image onto the user device 110 or by the user device 110 in uploading the altered image to the social networking system 130 may produce visible artifacts in the images. To address these inefficiencies and quality concerns, the social networking system 130 may provide users with functionality for editing images within a user interface of the social networking system 130. Using this functionality, a user may edit an image as it resides within the social networking system 130 without having to download the original image to the user device 110, perform the edits on the user device 110, and re-upload the altered image. The various user devices 110 used to access images on the social networking system 130 may include publishing clients, e.g., devices that are used to upload original images and specify certain transformations to be applied to the original images, and consuming clients, e.g., devices that are used to view copies of altered images. According to an embodiment, the functionality for editing images may be provided by the social networking system 130 or by a separate entity.

Figure 2D:
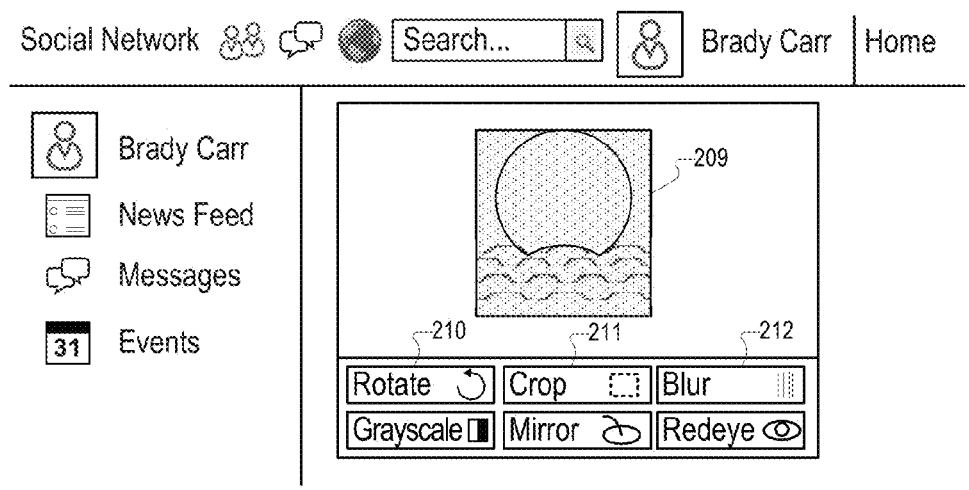
FIG. 2D illustrates the user applying a number of transformations to the image, resulting in an altered image in accordance with an embodiment of the invention.

FIGS. 2A-2D illustrate photo editing functionality of the social networking system 130 according to an embodiment of the invention. In FIG. 2A, user Brady Carr has captured an image 202 with the built-in camera of his mobile device 201. The mobile device 201 may be a smartphone, a tablet device, a laptop computer with a built-in camera, or other user device 110. Alternatively, the image 202 may be taken with a dedicated camera (not pictured) and transferred to a user device such as a laptop computer or a desktop computer. In FIG. 2B, Brady Carr has accessed a user interface 204 to upload the image 202 to the social networking system 130. Brady Carr selects an 'upload' option 205 within the user interface 204 that prompts him to browse to the location of the image 202 on the local storage of his mobile device 201. He locates the image 202, indicated by a thumbnail 203 and a filename 'image.jpg', and selects the 'OK' option 206. In FIG. 2C, the image 202 has been uploaded to the social networking system 130 and is displayed within the user interface 204. The user interface 204 in FIG. 2C includes a photo editing utility 207 with an options toolbar 208 to allow a user to select transformations to be applied to an image. In FIG. 2D, Brady Carr, using the photo editing utility 207 and the options toolbar 208, has applied a number of transformations to the image 202, resulting in an altered image 209. These transformations include a 90 degree rotation, indicated by a 'rotate' button 210, a crop, indicated by a 'crop' button 211, and a blur, indicated by a 'blur' button 212. Brady Carr may finalize and submit these transformations by selecting a save option 213. The altered image 209 may be viewed by a user of the social networking system 130 on a user device 110.

According to an embodiment, the user may select an option that applies a high-level effect to the image 202. The high-level effect may alter the image to convey a particular impression or type of scene. The high-level effect may be implemented by combining several transformations. For example, an effect called 'western' may be implemented by applying a transformation that adds fake film grain and a transformation that converts the image 202 into a sepia-toned image. In an embodiment, the high-level effect may be identified by a single unique identifier, and the user device may provide the unique identifier to the social networking system 130 when the user selects the high-level effect and selects a save option. In an embodiment, the user may design his own high-level effects by selecting multiple transformations and saving the selected transformations for application to other images. In an embodiment, the user may share the high-level effect he has designed with other users. In an embodiment, the high-level effects may be specified using text-based unique identifiers that may be entered in a command-line interface.

Images may be viewed and edited using a client. A client may refer to a device, an application, a portal, a photo editing tool, or any hardware or software component used to access or otherwise handle an image. Clients may include publishing clients and consuming clients. A publishing client may refer to a client used to select transformations for application to an image. In FIGS. 2A-2D, the mobile device 201 and the photo editing utility 207 may be publishing clients. A consuming client may refer to a client used to view an image. In FIGS. 2A-2D, an application or device used to view the altered image 209 may be a consuming client. Consuming clients may include smart consuming clients and simple consuming clients. A smart consuming client may refer to a consuming client that receives transformations and an original image copy and applies the transformations to the original image copy. A simple consuming client may refer to a consuming client that receives a copy of an altered image to which the transformations have already been applied by the social networking system 130.

According to an embodiment, a single user device 110 may function as both a publishing client and a consuming client. For example, the user device may have a photo editing application with photo editing functionality and a photo viewing application with no photo editing functionality. The user device may function as a publishing client when the photo editing application accesses an image and as a consuming client when the photo viewing application accesses the image. In an embodiment, a consuming client may function as both a simple consuming client and a smart consuming client. For example, a user device 110 may have a battery level threshold below which it activates a power-saving mode. The power-saving mode may prevent the user device 110 from applying image transformations. Thus, when the battery level of the user device 110 is above the threshold for the power-saving mode, the user device 110 may function as a smart consuming client that applies transformations to an original image copy. When the battery level of the user device 110 falls below the threshold for the power-saving mode, the user device 110 may function as a simple consuming client that receives an altered image copy to which the transformations have already been applied.

Figure 3:
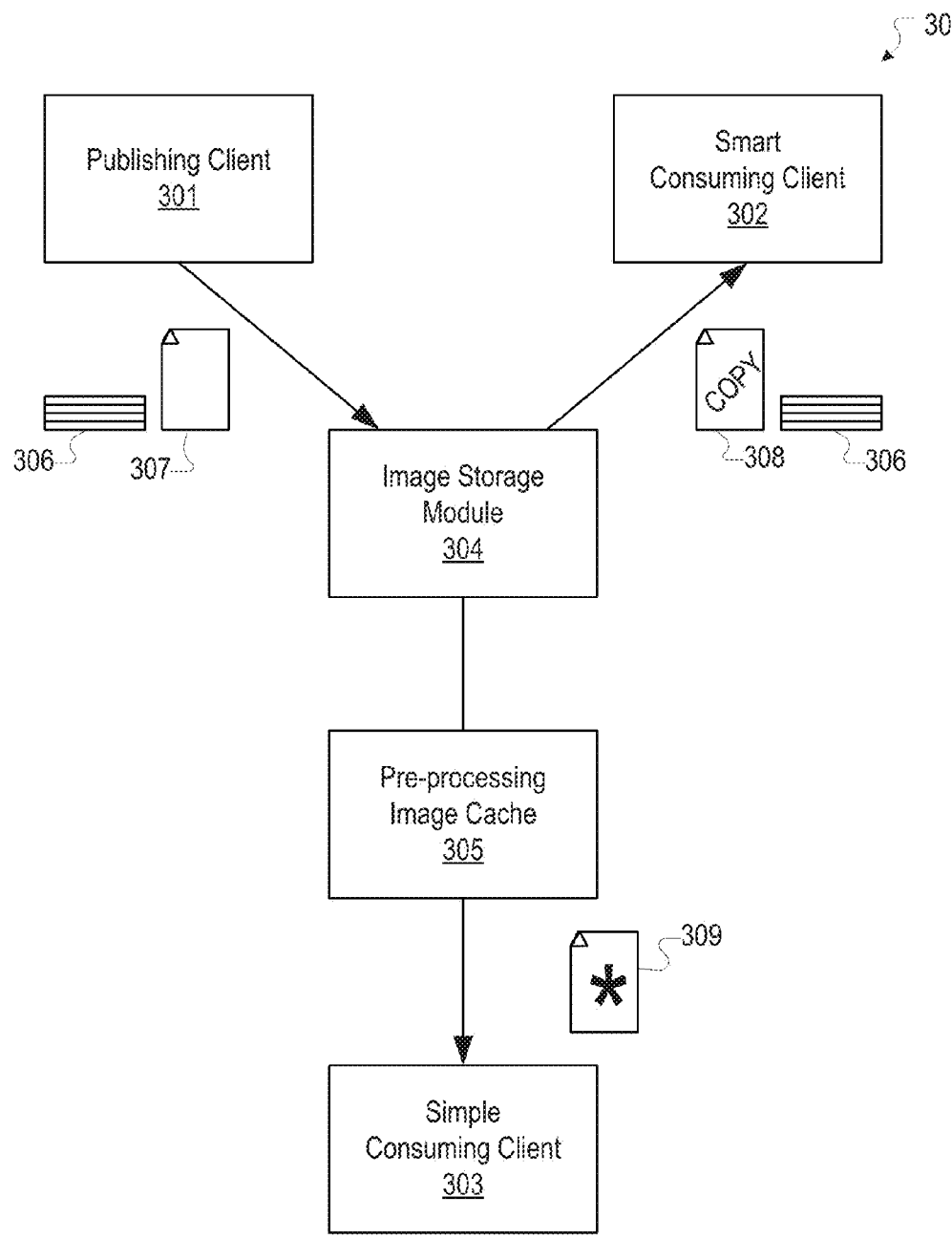
FIG. 3 illustrates an example environment within which some embodiments of the invention may be implemented in accordance with an embodiment of the invention.

FIG. 3 illustrates an example environment 300 within which some embodiments of the invention may be implemented. The environment 300 may include a publishing client 301, a smart consuming client 302, a simple consuming client 303, an image storage module 304, and a pre-processing image cache 305. The publishing client 301 may correspond to a user device 110 on which a user selects transformations to be applied to the original image. The publishing client 301 provides a set of transformations 306 (and, optionally, an original image 307) to the image storage module 304 where the transformations are stored and associated with the original image 307. The image storage module 304 creates a copy 308 of the original image that may be optimized for the smart consuming client 302. The smart consuming client 302 may correspond to a user device 110 that receives an original image copy 308 and the selected transformations 306, and applies the selected transformations to the original image copy 308. The pre-processing image cache 305 may receive the original image 307 and associated transformations 306 from the image storage module 304. The pre-processing image cache 305 may create a copy 310 of the original image that is optimized for the simple consuming client 303 and apply the transformations to the original image copy 310. The pre-processing image cache 305 may create a copy 310 of the original image 307 and apply the transformations 306 to the original image copy 310 either in response to a request for a particular altered image 309 from the simple consuming client 303 or at periodic intervals. The simple consuming client 303, which may correspond to a user device 110, receives from the pre-processing image cache 305 a copy of the altered image 309 to which the selected transformations 306 have already been applied. According to an embodiment, the image processing module 146 of the social networking system 130 may be implemented to include the image storage module 304 and the pre-processing image cache 305.

The processes and techniques for applying transformations and viewing altered images may be implemented in a number of ways. Editing the image within a user interface of the social networking system 130 may result in the image being downloaded and altered by the publishing client in response to the user requesting the image and selecting transformations to be applied to it. This is because the publishing client may need to download a copy of the image in order to display it to the user, and the transformations selected by the user within the user interface may need to be applied in some form on the publishing client in order to show the user what the altered image would look like. However, on the publishing client, the user may be seeing a preview or copy of the image, not the original image itself. The social networking system 130 may create a copy of the original image that is optimized for the publishing client and provide the copy to the publishing client. The publishing client may apply the transformations selected by the user to the original image copy. When the user finalizes his edits to the original image copy, the publishing client may provide the transformations, not the entire altered image copy, to the social networking system 130. This minimizes the amount of data transmitted between the social networking system 130 and the publishing client. Due to bandwidth and processing limitations of user devices, particularly mobile devices, it may be desirable to limit the amount of data transmitted between the publishing client and the social networking system 130. Providing a list of transformations to the social networking system 130 may require much less bandwidth and consume fewer computing resources than providing an image.

According to an embodiment of the invention, all of the consuming clients may be smart consuming clients. In this embodiment, it may be possible for the social networking system 130 to only store a copy of an original image in a distributed cache storage. Every consuming client may retrieve the original image copy and apply transformations to the original image copy. In an embodiment, the existence of simple consuming clients may require the social networking system 130 to apply a transformation and incur a computation cost to the system. However, the computational cost may be reasonable if simple consuming clients are rare. If simple consuming clients are common, then it may be preferable for the social networking system 130 to cache the altered images. The social networking system 130 may save computation costs, while incurring cache storage costs. In an embodiment, the social networking system 130 may store both original image copies and altered image copies for a current user device landscape in which both smart consuming clients and simple consuming clients are common, and gradually reduce storage space devoted to altered image copies in anticipation of smart consuming clients becoming predominant and simple consuming clients becoming obsolete.

According to one embodiment of the invention, each transformation may be declaratively expressed in a human readable language or format. Such a language or format may include a character or a set of characters that includes a unique identifier for the transformation along with its optional accompanying parameters. Some transformations may not be accompanied by parameters, e.g., a blur may or may not allow the user to specify the intensity or strength of the blur. For example, the crop transformation may be expressed by the letter 'C' and a parenthetical expression indicating the pixel range for the crop, such as C(12, 42, 24, 84) for a crop in which the top left corner of the cropped area is an image pixel with x coordinate 12 and y coordinate 42 and whose extent is 24 pixels wide and 84 pixels tall. According to one embodiment, each transformation may be expressed as an integer value. The transformations selected by a user and the order in which the user selected them may be expressed as a character string that includes the unique identifiers of each transformation and its optional accompanying parameters. The character string may be expressed according to, for example, a universal or predetermined convention or a code partially or exclusively determined by the social networking system 130. According to one embodiment, the character string may be provided to the social networking system 130 upon the user selecting a 'Save' option within a photo editing interface. The character string may be received by the social networking system 130 and applied to the original image.

According to an embodiment of the invention, the parameters of a transformation may be expressed in terms of specific pixels or pixel ranges in the original image, as in the example above. According to another embodiment, the parameters of a transformation may be expressed in terms of specific pixels or pixel ranges in the transformed image. For example, a resize transformation may be expressed as R(200, 400) wherein the parameters (200, 400) indicate that the original image should be resized such that the transformed image has dimensions 200×400. In an embodiment, a publishing client or the social networking system 130 may express absolute parameters specified by a user as relative parameters. For example, if an original image has dimensions 1000×2000, then a crop with absolute parameters C(100, 200, 200, 400) may be expressed as C'(10, 10, 20, 20) wherein the parameters of C' are relative parameters based on the absolute parameters associated with C. In an embodiment, relative parameters may be translated into absolute parameters by treating them as percentages of the original image dimensions. Thus, C'(10, 10, 20, 20)=C(10% of 1000, 10% of 2000, 20% of 1000, 20% of 2000)=C(100, 200, 200, 400).

According to an embodiment of the invention, relative parameters may refer to x coordinates and horizontal extents that are percentages of the original image width and y coordinates and vertical extents that are percentages of the original image height. Resizing may be expressed similarly: R'(20, 20)=R(20% of 1000, 20% of 2000)=R(200, 400). The publishing client (and, upon delivery, any smart consuming client), as described above, may apply transformations to a copy of the original image, and the copy may have smaller dimensions than the original. Thus, to apply the same transformations to the original image, the parameters associated with the transformations may need to be adjusted to account for to the size of the original image. Such an adjustment may not be needed if the transformation parameters are expressed as percentages. Expressing transformation parameters as percentages may also facilitate sharing of transformations and user-designed high-level effects for application to different images. Furthermore, although the above example is focused on coordinates and extents, relative parameters may have a more general nature. For example, a blur may also have an intensity/strength parameter, and the parameter may be expressed in a way that makes the description of the blur transformation independent of the image size. To achieve the same visual result as a heavy blur on a 1000×1000 image followed by resizing of the blurred image to dimensions of 500×500, the original 1000×1000 may be resized to obtain a 500×500 copy. A mild blur may be applied to the resized image. A heavy blur with a filter radius of 4 applied to a 1000×1000 image may become a mild blur with a radius of 2 on a 500×500 image. Generally, intensity need not be expressed as a radius, which is a pixel extent. Thus, "relative" transformation parameters may be more general than simple percentages.

Upon receiving the transformations, the social networking system 130 may apply the transformations to the original image stored within the social networking system 130 and replace the stored image with the altered image. Alternatively, the social networking system 130 may store the list of transformations and associate it with the original image for later application. The former approach, though intuitive, may have a number of undesirable consequences. When transformations are applied to an original image and the altered image is stored in place of the original image, it may be difficult or impossible to undo the transformations if the user later wishes to retrieve the original image. The user may, for example, crop a person out of her profile picture whom she later decides to 'de-crop' and re-add to the picture. This may be overcome by retaining a copy of the original image along with the altered image. However, doing so may require extra disk space for each instance that the user edits an image and thereby consume an excessive amount of storage within the social networking system 130. In addition, the user may wish to separately apply several sets of transformations to the original image, resulting in multiple altered images created from the same original image and thus compounding the need for excessive amounts of storage. In an embodiment, the user may specify privacy settings for images. For example, the user may elect to keep the original image private and share images to which transformations have been applied with other users of the social networking system 130. The user may specify different privacy settings for different altered images based on the same original image.

According to an embodiment of the invention, the original image and altered images may have different privacy settings. For example, a user may keep an original image of a fashion model private and publicize an altered, retouched image. In another example, a user may publicize an original image of a landscape and offer an altered, artistically improved image of the landscape only to friends in order to entice other users to "friend" him. In another example, a first user may publicize an original image of a celebrity, a second user may transform the original image of a celebrity with a balloon annotation, and the first user may set the original image of the celebrity to private while the second user keeps the altered remains public.

In an embodiment, a smart consuming client may need to apply transformations to an original image to which the user of the smart consuming client does not have access. This concern may be addressed with authorized smart consuming clients that be trusted to prevent access to the original copy when privacy settings demand so. Alternatively, the social networking system 130 may provide the altered image with an identify (no-op) transformation to an insecure smart consuming client when the original's privacy settings would prohibit delivery of the original image with the transformations.

If the social networking system 130 stores the transformations and associates them with the original image rather than applying the transformations and storing the altered image or images, the social networking system 130 may apply the transformations to a copy of the original image and provide the altered copy to a consuming client each time the image is requested. In this embodiment, the consuming client is a simple consuming client. Alternatively, the social networking system 130 may create a copy of the original image and provide the original image copy and the transformations to the consuming client, allowing the consuming client to apply the transformations to the original image copy. In this embodiment, the consuming client is a smart consuming client. In either embodiment, storing the transformations and associating them with the original image for later application allows for the transformations to be applied not to the original image, but to a copy of the image that is optimized for the consuming client from which it is requested. The social networking system 130 may thus apply the transformations, or a subset of the transformations, in a manner that accounts for a device's capabilities and features. For example, if the consuming client requesting the altered image has a smaller display and more limited graphics processing capabilities than the publishing client, the social networking system 130 may create a copy of the original image that is scaled down to fit within the display of the consuming client. Thus, applying the transformations at the time that the image is requested may be a more efficient and versatile approach to processing user edits.

In addition, maintaining transformations separately from the images to which they may be applied poses other advantages. For example, when maintained in a manner distinct from the original images to which they are applied, the transformations can be readily applied to other images. The other images may be different in content from the original images or copies thereof. As discussed in further detail below, certain transformations may be used by or shared with other users to be applied to any images, as desired.

Figure 4:
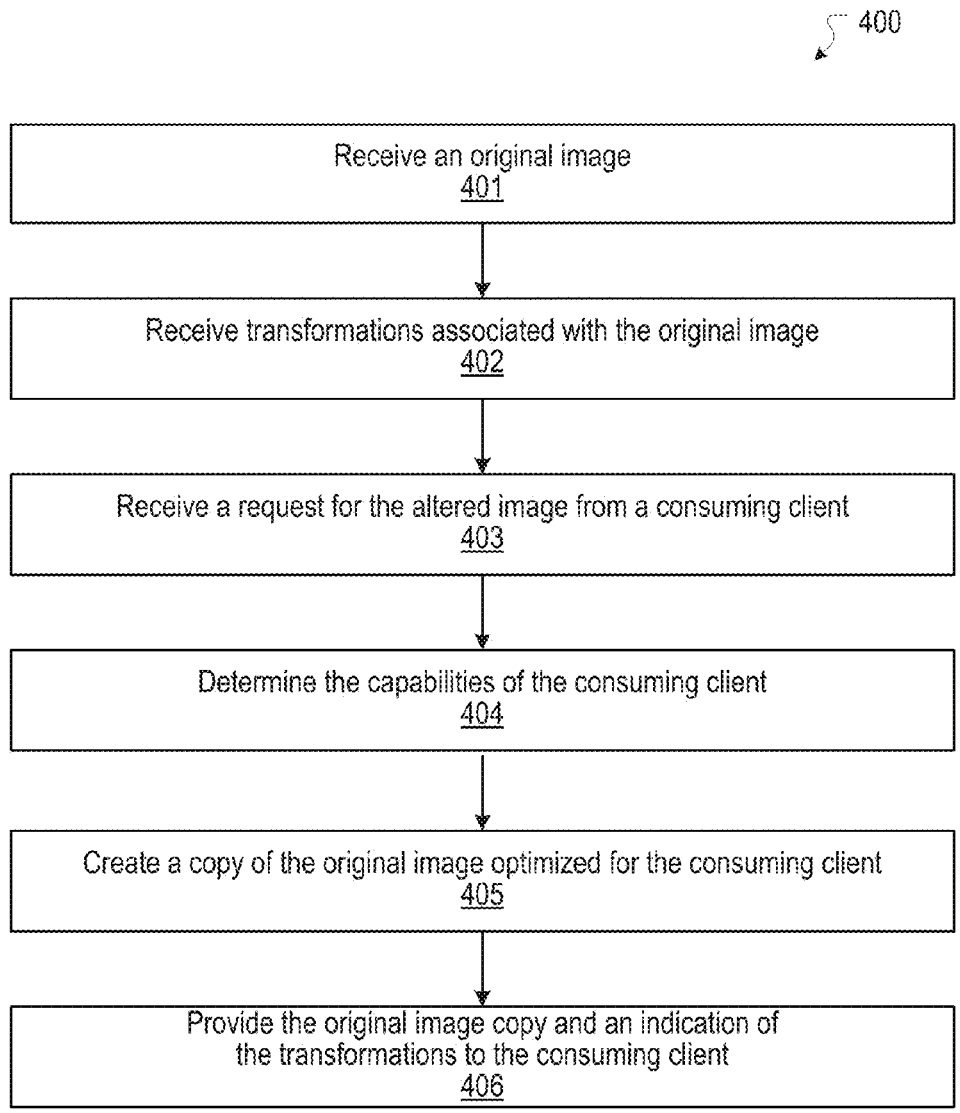
FIG. 4 illustrates a process for applying transformations to an original image in accordance with an embodiment of the invention.

FIG. 4 illustrates a process 400 for applying transformations to an original image according to an embodiment of the invention. At block 401, the social networking system 130 receives an original image. At block 402, the social networking system 130 receives transformations associated with the original image. The original image and the transformations may be received simultaneously or at different times. The original image and the transformations may be received from the same publishing client or from different publishing clients. At block 403, the social networking system 130 receives a request for the altered image from a consuming client. At block 404, the social networking system 130 determines the capabilities of the consuming client. This may be accomplished through the use of a client identifier, as described in further detail below. At block 405, the social networking system creates a copy of the original image that is optimized for the consuming client. At block 406, the social networking system provides the original image copy and the transformations to the consuming client. The consuming client applies the transformations to the original image copy.

According to one embodiment of the invention, the social networking system 130 may determine whether the consuming client is a smart consuming client or a simple consuming client. The social networking system 130 may provide the original image copy and the transformations to the consuming client or apply the transformations to the original image copy and provide the resulting altered image copy to the consuming client based on whether the consuming client is a smart consuming client or a simple consuming client, respectively. For example, the social networking system 130 may determine that the consuming client is a simple consuming client because it is constrained or incapable of applying the selected transformations to the original image copy itself. This may be due to hardware limitations of the consuming client, functionality limitations of the application used to access the social networking system 130 from the consuming client, or privacy settings specified by the user who created or uploaded the image. The social networking system 130 may determine, at block 404 of the process 400, that the selected transformations cannot be applied to the original image copy on the consuming client. In this embodiment, the social networking system 130 may itself apply the transformations to the original image copy and provide the resulting altered image copy to the consuming client. Thus, in an alternative implementation of the process 400, if at block 404, the social networking system 130 determines that the consuming client is a simple consuming client, then the social networking system 130 may apply the transformations to the original image copy itself. The social networking system 130 may then provide the resulting altered image copy to the simple consuming client. According to an embodiment, the process 400 may be entirely or partially performed by the image processing module 146 or other modules of the social networking system 130.

The process 400 may be implemented in various embodiments. The social networking system 130 may be accessed from a variety of clients, each of which may have its own unique set of capabilities, features, and photo editing tools that may involve their own image transformations. In addition, the operator of the social networking system 130 may provide a number of different portals and applications that may have varying transformation capabilities and profiles, ranging from a website accessed from within a web browser to customized applications designed for specific platforms or customized hardware with editing controls. Thus, the set of transformations available to users of the social networking system 130 for editing their images may not be identical across photo editing tools associated with the various devices, portals, and applications used to access the social networking system 130.

For example, this may be the case if the implementation of a transformation within the social networking system 130 is modified. In this example, a user may access the social networking system 130 using an out-of-date application that has not been updated to reflect the most recent set of transformations available within the social networking system 130. The user may select transformations based on how they appear as applied to the original image on the publishing client, not based on how they are actually implemented within the social networking system 130. If the user selects a transformation on the publishing client whose implementation within the social networking system 130 has since been changed, the social networking system 130 may apply the newer version of the transformation instead of the version selected by the user on the publishing client, potentially resulting in a modification to the original image that the user did not intend.

According to one embodiment of the invention, this concern may be addressed by providing a client identifier that uniquely identifies the client on which the user is editing the image. The client identifier may refer to a device, an application, a portal, a photo editing tool, or any hardware or software component used to access an image. A publishing client identifier may be provided by the publishing client to the social networking system 130 along with the transformation identifiers for the transformations selected by the user, such as a character string or any other suitable type of identifier. According to one embodiment, the social networking system 130 may maintain a record of the various publishing client identifiers and the versions of each transformation that they correspond to within a storage module of the social networking system 130. Upon receiving the publishing client identifier and the transformation identifiers, the social networking system 130 may access the record and use the publishing client identifier and the transformation identifiers to determine the version of each transformation that the user selected on the publishing client.

According to one embodiment, a client identifier may be used not only to ensure that the correct version of the selected transformation is applied, but also to optimize the altered image for the consuming client. In addition to the publishing client providing a publishing client identifier, the consuming client may also provide a consuming client identifier to the social networking system 130 along with its request for a copy of the altered image. Based on the consuming client identifier, the social networking system 130 may determine that certain transformations need not be applied because the consuming client does not support them or is incapable of displaying them. For example, the social networking system 130 may be able to determine, using the consuming client identifier, that the consuming client has a grayscale display. Thus, the social networking system 130 may omit certain color-related transformations because the effect of those transformations would only be apparent on a color display. In addition, the social networking system 130 may create a grayscale version of the image to provide to the consuming client, since grayscale images typically require fewer bytes to store and display. In effect, the social networking system "appends" a grayscale transformation to the list of transformations specified by the user in order to spare the consuming client the computing costs of having to convert a color image to grayscale. In an embodiment, the social networking system 130 may determine that certain transformations are too computationally demanding for a particular consuming client to perform or display, and the social networking system 130 may thus substitute versions of the selected transformations that produce an image less demanding of computing resources on the consuming client.

Figure 5:
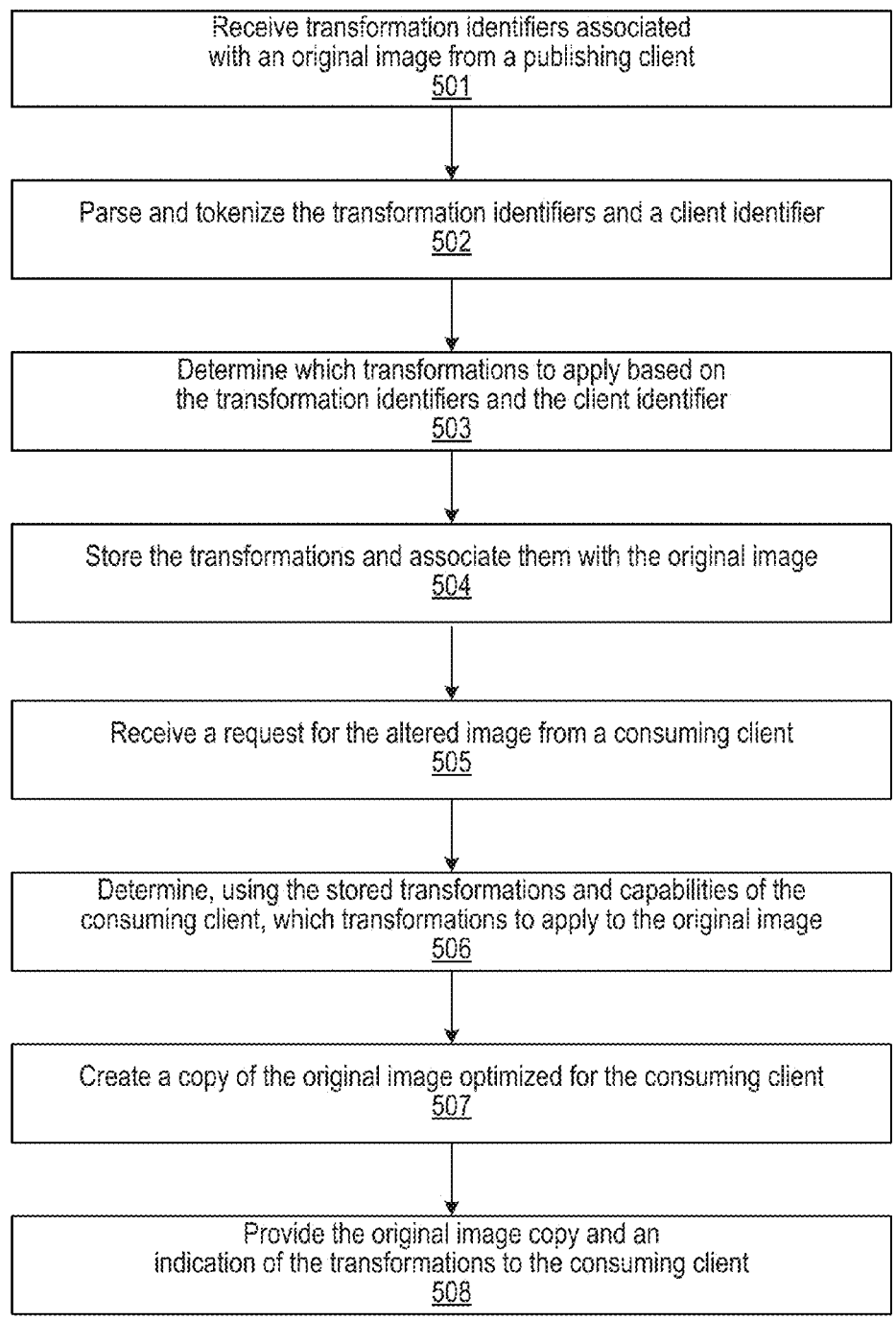
FIG. 5 illustrates a process for applying transformations to an original image using transformation identifiers and client identifiers in accordance with an embodiment of the invention.

FIG. 5 illustrates a process 500 for applying transformations to an image using transformation identifiers and client identifiers in accordance with an embodiment of the invention. Initially, a user of a publishing client requests an original image stored within the social networking system 130. The user may be requesting an original image that was previously uploaded to the social networking system 130 by him or another user and made public by that user. Alternatively, the request may be generated automatically upon the user accessing an upload interface on the publishing client that displays a copy of the original image after the user has uploaded it. The user may request the original image through an interface of the social networking system 130 viewed within a web browser or an application customized for the social networking system 130 and the publishing client. The user receives a copy of the original image from the social networking system 130 on the publishing client and accesses a photo editing interface of a photo editing tool to modify the image. Within the photo editing interface, the user selects at least one transformation to be applied to the original image and selects an option to save the original image. At block 501, the social networking system 130 receives transformation identifiers associated with the original image from the publishing client. The transformation identifiers may be expressed in the form of a transformation character string. The transformation character string may identify the transformations selected by the user in the form of a character or set of characters corresponding to each transformation and the parameters, if any, that accompany it.

At block 502, the social networking system 130 parses and tokenizes the transformation identifiers and a publishing client identifier. If the transformation identifiers are expressed as a transformation character string, the social networking system 130 may parse the string according to a predetermined convention or according to an internal or external specification. The social networking system 130 may additionally identify the parameters, if any, that accompany the transformation identifiers. At block 503, the social networking system 130 uses the transformation identifiers and the publishing client identifier to determine precisely which transformations the user has selected. The publishing client identifier may be used to determine which version of a particular transformation was available on the application, platform, or device so that the proper version may be applied to the original image when it is requested. At block 504, the social networking system 130 stores the identified transformations and associates them with the original image.

At block 505, the social networking system 130 receives a request for the altered image from a consuming client. The request may include a consuming client identifier. At block 506, the social networking system 130 determines, using the stored transformations and the capabilities of the consuming client, which transformations to apply to the original image. The capabilities of the consuming client may correspond to the capabilities of the device, portal, or application used to access the social networking system 130. The social networking system 130 may use the consuming client identifier to determine the capabilities. The social networking system 130 may identify the capabilities so that, for example, only those transformations whose effect will be apparent on the consuming client may be applied. At block 507, the social networking system 130 creates a copy of the original image that is optimized for the consuming client. At block 508, the social networking system 130 may provide the original image copy and an indication of the transformations to the consuming client, which may apply the transformations to the original image copy. Alternatively, if the consuming client is a simple consuming client, the social networking system may apply the transformations determined in block 506 to the original image copy and provide the altered image to the simple consuming client. According to an embodiment, the process 500 may be entirely or partially performed by the image processing module 146 or other modules of the social networking system 130.

The process 500 may require the social networking system 130 to keep track of all of various devices, platforms, applications, and photo editing tools used to select image transformations. This may potentially be cumbersome and difficult, particularly since many devices, platforms, and applications may be provided by third parties without the direct knowledge or participation of the operator of the social networking system 130. According to one embodiment of the invention, this limitation may be addressed by providing a version number along with each character or set of characters that identifies a transformation. In this embodiment, a transformation identifier may be expressed as a character or set of characters that identifies the transformation, the parameters of the transformation, and a character or set of characters that identifies the version of the transformation. The social networking system 130 may receive this transformation identifier from the publishing client and identify which version of the transformation to use without having to determine it from a publishing client identifier. This embodiment frees the social networking system 130 from the need to continuously track each device, platform, application, and photo editing tool that may be used to select image transformations and determine which version of each transformation it uses.

Although providing version numbers with each transformation may decrease the amount of data that the social networking system 130 must store and maintain, it may still result in inefficiencies. In order to interpret the version numbers, the social networking system 130 may need to continuously track every version of every transformation ever implemented on an application, platform, device, or photo editing tool used to select image transformations.

According to one embodiment of the invention, the amount of data stored or tracked within the social networking system 130 corresponding to transformations can be further minimized through the use of a hash function. A hash function maps potentially large data sets to smaller values, possibly of fixed length. In this embodiment, the transformation character string provided by the publishing client to the social networking system 130 may be processed using a hash function, resulting in a smaller string of values, i.e., a hash, that may be stored and associated with the original image. When the altered image is requested by a consuming client, the hash may be translated back to the transformation character string using the hash function and provided to the consuming client.

This embodiment may be particularly useful for transformations that comprise many operations. For example, a particular transformation involving several distinct operations may be expressed as a single command in a photo editing interface of a photo editing tool on the publishing client. When the user selects this transformation, the publishing client may concatenate identifiers corresponding to each of the operations included in the transformation instead of providing a single identifier for the transformation as a whole. Because the resulting transformation character string may be lengthy, the social networking system 130 may reduce the amount of data it needs to store by mapping the transformation character string to a hash of fixed length. If the social networking system 130 has, for example, hundreds of millions of users, even small savings in data storage per user may result in significant savings in the aggregate. This embodiment also facilitates predictability in data storage allocation. If the hash is of fixed length, each hash may comprise a roughly equivalent amount of data, which allows the operator of the social networking system 130 flexibility in designing scalable data systems. Moreover, the resulting transformation character strings may be identical across different photos, across different users who use the same editing tool or across different tools based on a shared open source editing core. Identical strings may be represented by the same hash.

Figure 6:
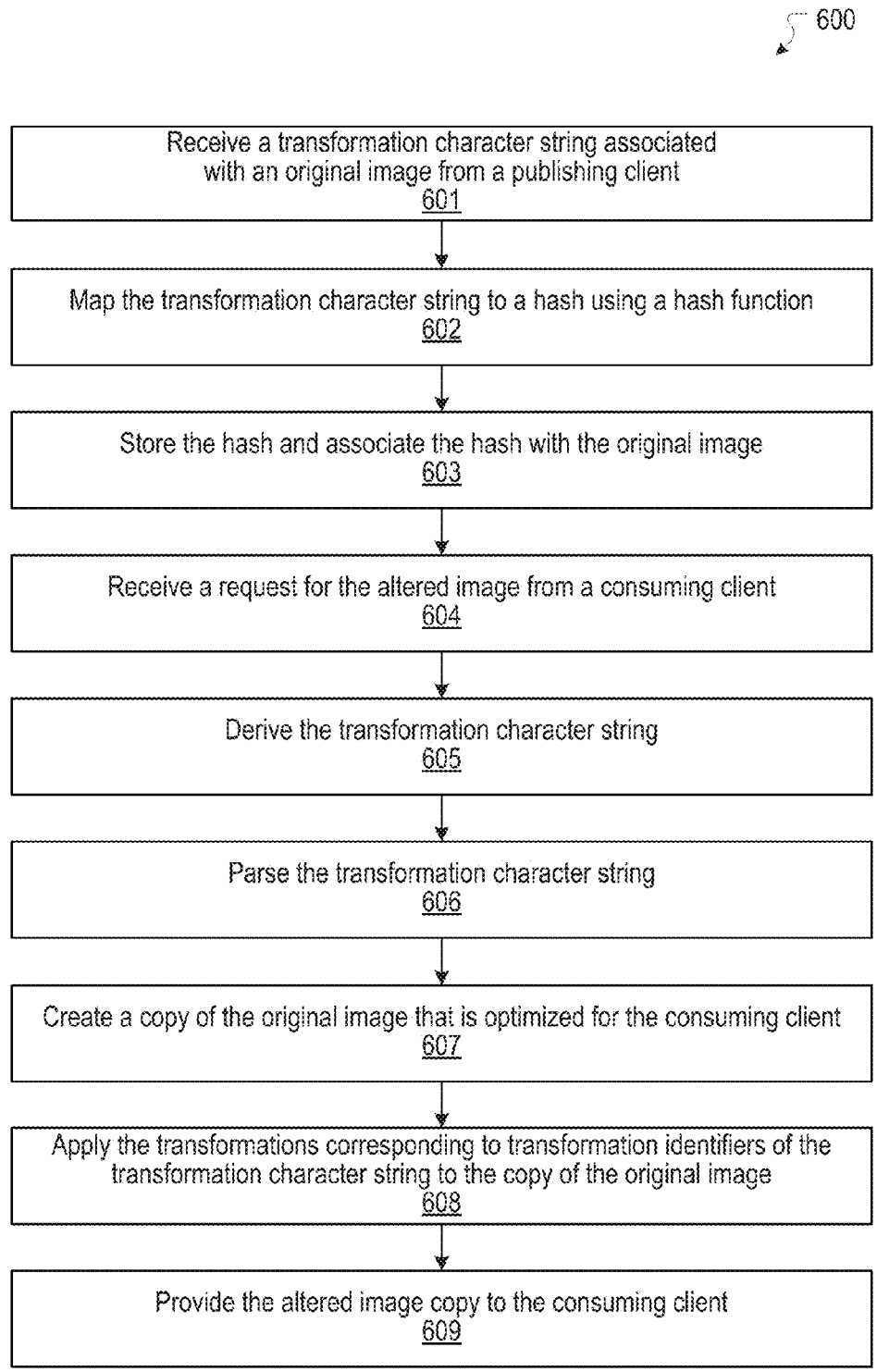
FIG. 6 illustrates a process for mapping transformations to a hash in accordance with an embodiment of the invention.

FIG. 6 illustrates a process 600 for mapping transformations to a hash in accordance with an embodiment of the invention. Initially, a user of a publishing client requests an original image stored within the social networking system 130. The user may be requesting an original image that was previously uploaded to the social networking system 130 by him or another user and made public by the user. Alternatively, the request may be generated automatically upon the user accessing an upload interface on the publishing client that displays a copy of the original image after the user has uploaded it. The user may request the original image through an interface of the social networking system 130 viewed within a web browser or an application customized for the social networking system 130 and the publishing client. The user receives a copy of the original image from the social networking system 130 on the publishing client and accesses a photo editing interface to modify the image. Within the photo editing interface, the user selects at least one transformation to be applied to the original image and selects an option to save the original image. At block 601, the social networking system 130 receives a transformation character string associated with the original image from a publishing client. The transformation character string may express the transformations selected by the user in the form of a character or set of characters corresponding to each transformation and the parameters, if any, that accompany it. A transformation that includes multiple operations may be expressed as a concatenated string with characters corresponding to all included operations rather than as a single character or set of characters corresponding to the transformation as a whole.

At block 602, the social networking system 130 maps the transformation character string to a hash using a hash function. The hash function may be a global hash function used by the social networking system 130 for every transformation character string it receives. Alternatively, the hash function may be unique to a particular image, a block of images, a device, a platform, an application, or a particular type of publishing client. Any technique for determining a hash function may be used. At block 603, the social networking system 130 stores the hash and associates it with the original image. In an embodiment, the social networking system 130 may also store the transformation character string. At block 604, the social networking system 130 receives a request for the altered image from a consuming client. The consuming client may be the same device as the publishing client. Alternatively, the consuming client may be a different device from the publishing client. At block 605, the social networking system 130 uses the hash function to derive the transformation character string from the hash. At block 606, the social networking system 130 parses the transformation character string. The social networking system 130 may parse the string according to a predetermined convention or according to an internal or external specification. By parsing the transformation character string, the social networking system 130 may tokenize or otherwise discern the transformation identifiers contained in the transformation character string. At block 607, the social networking system 130 creates a copy of the original image that is optimized for the consuming client. At block 608, the social networking system 130 applies transformations corresponding to the transformation identifiers included in the string to the copy of the original image. At block 609, the social networking system 130 provides the altered image copy to the consuming client. Alternatively, if the consuming client is a smart consuming client, then at block 608, the social networking system 130 provides the original image copy and the transformations to the smart consuming client and the smart consuming client applies the transformations to the original image copy. According to an embodiment, the process 600 may be entirely or partially performed by the image processing module 146 or other modules of the social networking system 130.

In an embodiment, the social networking system 130 may store both the hash as well as the tokenized form of the string calculated in block 603. This may require some additional storage, but it may save the CPU cost of parsing the same string repeatedly, which in turn may result in both server-side power savings and faster execution. It may also facilitate detection of syntax errors in the provided strings, and allow for rejection of malformed strings without the need to store them in the hash table.

According to one embodiment of the invention, some transformations may produce effects that involve creating random noise within an image. For example, the social networking system 130 may provide a transformation that gives an image a grainy appearance to simulate the look of an old-fashioned photograph. These transformations may rely on random number generators for the placement of artifacts or other elements within the image. The random number generator may output a sequence of random values that affect how artifacts or other elements are placed or appear within the image. A notable consequence of this functionality is that a transformation that relies on a random number generator may produce a different effect each time it is applied. Thus, an image to which such a filter has been applied may look different each time it is requested.

According to one embodiment of the invention, this concern may be addressed through the use of random number seeds. Many random number generators accept a seed, i.e., an initial value that the random number generator uses as a basis to generate subsequent values. A random number generator seeded with a particular value may always generate the same sequence of subsequent values. According to one embodiment, if a user selects a transformation that uses a random number generator, the publishing client may initiate the random number generator, record the initial value generated by the random number generator as a seed, and provide the seed with the transformation identifiers to the social networking system 130. The seed may be provided as a parameter with a transformation identifier. The social networking system 130 may store the seed along with the transformation identifiers associated with the original image. When the altered image is requested, the random number generator may be initiated, either by the social networking system 130 or by the consuming client, with the stored seed such that it outputs the same sequence of values as when the transformation was first applied to the original image.

According to one embodiment of the invention, expressing image transformations as a character string or other human readable form may facilitate social sharing of transformation sets among users of the social networking system 130. A user may conceive a sequence of transformations that produce a desirable effect on an image to which they are applied. For example, a user may discover a sequence of transformations that sharpens blurry images or otherwise achieves an aesthetically desirable visual effect. The user may wish to make this set of transformations available for future use on other images by him or by his friends. According to one embodiment, a user may save a set of transformations applied to an image separately from the image itself. In this embodiment, the user may select an option within a photo editing interface that saves the sequence of transformations for later application to other images. The user may give the sequence of transformations a unique name and choose to make it available to his friends or other users of the social networking system 130. According to another embodiment, the user may publish the sequence of transformations on his profile, which may cause it to appear in the news feeds of his friends. The user's friends may access the sequence of transformations and apply them to their own images. According to yet another embodiment, the social networking system 130 may maintain a marketplace where these "custom" transformations are offered for free or for sale to other users.

According to one embodiment, the user may apply different transformations to the same image, producing a family of altered images derived from the same original. For example, a transformation may be a text balloon annotation, the image may be a celebrity photo, and different altered images may depict the celebrity expressing different thoughts in thought balloons (e.g., "I am bored today", or "Zzzz . . . "). A single user may create multiple such alterations or different users may each create one or more alterations of a publicly shared original image.

Hardware Implementation

Figure 7:
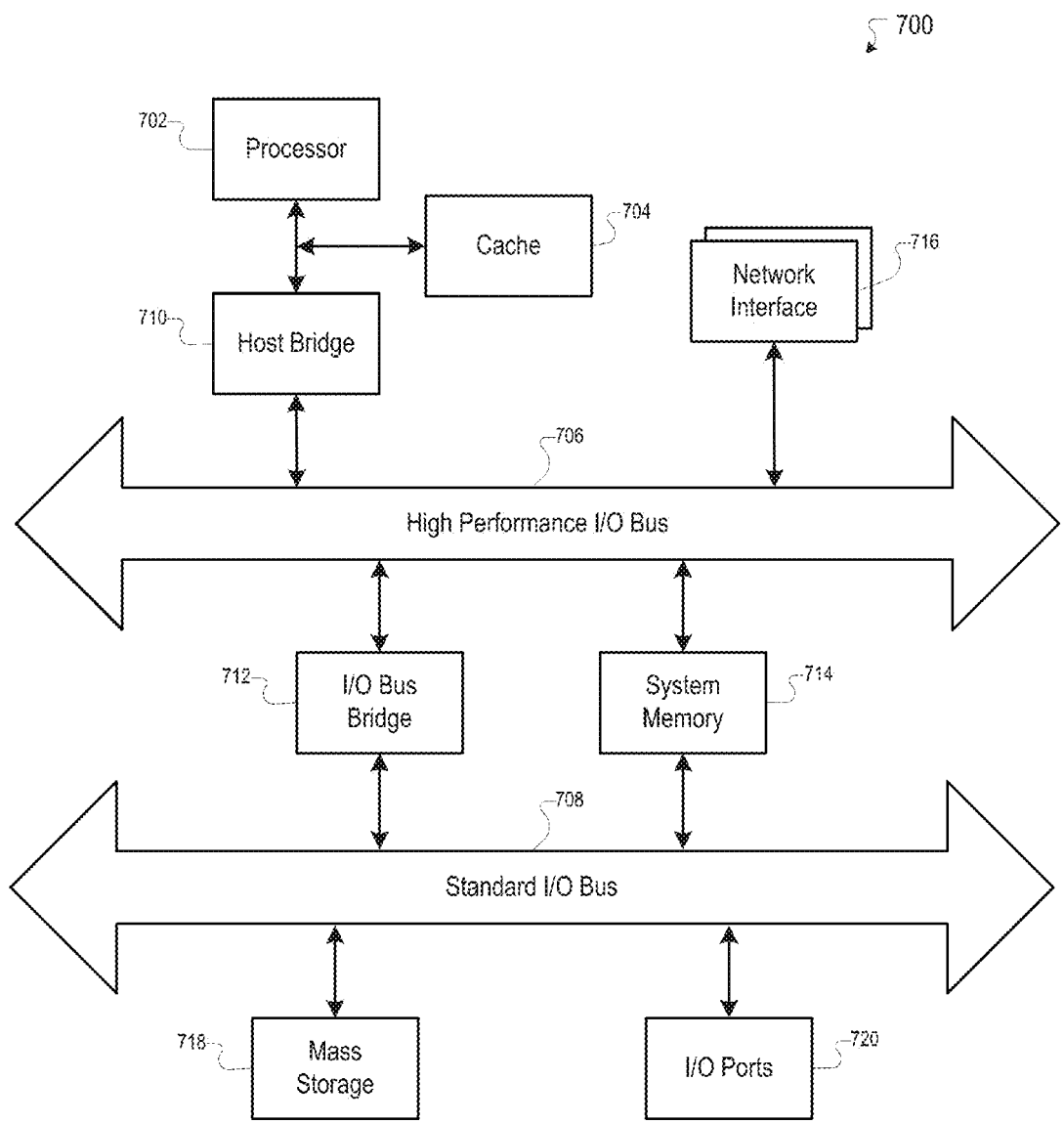
FIG. 7 illustrates an example of a computer system that may be used to implement one or more of the embodiments described herein.

The foregoing processes and features can be implemented by a wide variety of machine and computer system architectures and in a wide variety of network and computing environments. FIG. 7 illustrates an example of a computer system 700 that may be used to implement one or more of the computing devices identified above. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 130, the user device 110, and the external system 120, or a component thereof. In an embodiment of the invention, the computer system 700 may be one server among many that constitutes all or part of the social networking system 130.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method comprising:
by one or more computing servers of a social-networking system, receiving, from a publishing client device of a first user, at least one transformation identifier associated with a first image maintained by the social-networking system, wherein each of the transformation identifiers uniquely identifies a transformation selected by the first user at the publishing client device for application to the first image;
by one or more computing servers of the social-networking system, receiving, from the publishing client device, a client identifier, wherein the client identifier uniquely identifies the publishing client device;
by one or more computing servers of the social-networking system, storing the at least one transformation identifier and the client identifier with the first image in a data store of the social-networking system; and
by one or more computing servers of the social-networking system, determining a transformation version for each selected transformation for application to the first image based on the at least one transformation identifier and the client identifier.

2. The method of claim 1, further comprising:
receiving a request for an altered image from a consuming client;
determining capabilities of the consuming client; and
creating a first image copy based on the first image and the capabilities, the first image copy being optimized to the capabilities of the consuming client.

3. The method of claim 2, wherein the consuming client is at least one of a smart consuming client and a simple consuming client.

4. The method of claim 2, further comprising:
applying the at least one transformation to the first image copy to create an altered image copy; and
providing the altered image copy to the consuming client.

5. The method of claim 2, further comprising providing the first image copy and an indication of the at least one selected transformation to the consuming client.

6. The method of claim 2, further comprising:
determining at least one transformation version for the consuming client based on the at least one selected transformation and the capabilities;
creating an altered image copy by applying the at least one transformation version of the at least one selected transformation to the first image copy; and
providing the altered image copy to the consuming client.

7. The method of claim 2, further comprising:
determining at least one transformation version for the consuming client based on the at least one selected transformation and the capabilities; and
providing the first image copy and the at least one transformation version for the consuming client to the consuming client.

8. The method of claim 2, further comprising receiving a consuming client identifier, and wherein the determining capabilities of the consuming client is based on the consuming client identifier.

9. The method of claim 2, wherein the determining a transformation version for each selected transformation is further based on the capabilities.

10. The method of claim 1, further comprising mapping the at least one transformation identifier to a hash based on a hash function.

11. The method of claim 1, wherein the at least one transformation identifier is expressed in a human readable language.

12. The method of claim 1, wherein the at least one transformation identifier comprises a character string.

13. The method of claim 12, further comprising parsing the character string.

14. The method of claim 1, wherein the at least one transformation identifier comprises a random number seed to be used in the at least one transformation.

15. The method of claim 1, wherein the at least one transformation identifier may be used to apply the at least one selected transformation to a second image.

16. The method of claim 15, wherein the first image is associated with the first user of the social-networking system and the second image is associated with a second user of the social-networking system.

17. The method of claim 1, wherein the at least one transformation identifier may be provided by the first user of the social-networking system to a second user of the social-networking system.

18. A system comprising:
at least one processor; and
a memory storing instructions configured to instruct the at least one processor to perform:
receiving, from a publishing client device of a first user, at least one transformation identifier associated with a first image maintained by a social-networking system, wherein each of the transformation identifiers uniquely identifies a transformation selected by the first user at the publishing client device for application to the first image;
receiving, from the publishing client device, a client identifier, wherein the client identifier uniquely identifies the publishing client device;
storing the at least one transformation identifier and the client identifier with the first image in a data store of the social-networking system; and
determining a transformation version for each selected transformation for application to the first image based on the at least one transformation identifier and the client identifier.

19. A non-transitory computer-readable storage medium storing computer-executable instructions that, when executed, cause a computer system to perform a computer-implemented method comprising:
receiving, from a publishing client device of a first user, at least one transformation identifier associated with a first image maintained by a social-networking system, wherein each of the transformation identifiers uniquely identifies a transformation selected by the first user at the publishing client device for application to the first image;

receiving, from the publishing client device, a client identifier, wherein the client identifier uniquely identifies the publishing client device;

storing the at least one transformation identifier and the client identifier with the first image in a data store of the social-networking system; and determining a transformation version for each selected transformation for application to the first image based on the at least one transformation identifier and the client identifier.

* * * * *